(12) United States Patent
White et al.

(10) Patent No.: US 9,163,485 B2
(45) Date of Patent: Oct. 20, 2015

(54) CONNECTION APPARATUS AND METHODS

(75) Inventors: John White, Knaphill (GB); Brian Wells, Knaphill (GB); Colin Bickersteth, Knaphill (GB)

(73) Assignee: VERDERG CONNECTORS LTD, Knaphill (GB)

( * ) Notice: Subject to any disclaimer, the term of this patent is extended or adjusted under 35 U.S.C. 154(b) by 213 days.

(21) Appl. No.: 13/994,036

(22) PCT Filed: Dec. 14, 2011

(86) PCT No.: PCT/GB2011/052469
§ 371 (c)(1),
(2), (4) Date: Oct. 28, 2013

(87) PCT Pub. No.: WO2012/080724
PCT Pub. Date: Jun. 21, 2012

(65) Prior Publication Data
US 2014/0034327 A1   Feb. 6, 2014

(30) Foreign Application Priority Data

Dec. 15, 2010 (GB) .................................. 1021261.1

(51) Int. Cl.
*E21B 7/12* (2006.01)
*E21B 43/013* (2006.01)
*E21B 43/01* (2006.01)

(52) U.S. Cl.
CPC ........... *E21B 43/013* (2013.01); *E21B 43/0107* (2013.01)

(58) Field of Classification Search
CPC .................................................... E21B 43/013

USPC ................................................. 166/344, 368
See application file for complete search history.

(56) References Cited

U.S. PATENT DOCUMENTS 3,481,396 A    12/1969  Williams et al.
3,722,585 A     3/1973  Nelson et al.
(Continued)

FOREIGN PATENT DOCUMENTS

EP    0 572 732 A1   12/1993
GB    1 027 820 A     3/1965
(Continued)

OTHER PUBLICATIONS

Intec Engineering, "How does FTC Work" URL=http://www.intecengineering.com/expertise/dmac/ftc/how.asp, download date Nov. 24, 2006.

*Primary Examiner* — Matthew Buck
*Assistant Examiner* — Aaron Lembo
(74) *Attorney, Agent, or Firm* — Seed IP Law Group PLLC

(57) ABSTRACT

A vertical connection apparatus for connecting a pipeline to a subsea structure comprises a guide funnel for controlling the position of the pipeline relative to the subsea structure; a moveable barrier and a attachment region for a drive mechanism; the moveable barrier is operable between an open position in which the pipeline can pass through the guide funnel and a closed position in which the barrier prevent the end of the pipeline passing through the end of the guide funnel. A tool with a drive mechanism can be attached between the pipeline and guide funnel to manipulate the pipeline into a connectable position. A clamp connector secures the connection between the pipeline and subsea structure conduit.

16 Claims, 8 Drawing Sheets

(56) References Cited

U.S. PATENT DOCUMENTS

| | | | |
|---|---|---|---|
| 4,028,903 A * | 6/1977 | Dietrich | 405/170 |
| 4,191,256 A * | 3/1980 | Croy et al. | 166/343 |
| 4,591,292 A * | 5/1986 | Stevens et al. | 405/169 |
| 4,661,017 A | 4/1987 | Wood et al. | |
| 5,163,782 A * | 11/1992 | Paulo | 405/169 |
| 6,109,830 A | 8/2000 | de Baan | |
| 6,312,193 B1 * | 11/2001 | Witting et al. | 405/169 |
| 6,742,594 B2 * | 6/2004 | Langford et al. | 166/350 |
| 6,997,645 B2 * | 2/2006 | von Trepka et al. | 405/170 |
| 7,086,807 B2 * | 8/2006 | Mackinnon | 405/170 |
| 7,225,877 B2 * | 6/2007 | Yater | 166/344 |
| 7,281,880 B2 * | 10/2007 | Tucker et al. | 405/154.1 |
| 7,314,084 B2 * | 1/2008 | Rodrigues et al. | 166/344 |
| 7,402,000 B2 * | 7/2008 | Bastesen et al. | 405/170 |
| 7,422,066 B2 * | 9/2008 | Rodrigues et al. | 166/341 |
| 7,467,662 B2 * | 12/2008 | Smith | 166/343 |
| 7,794,177 B2 * | 9/2010 | DeLack | 405/172 |
| 7,967,070 B2 * | 6/2011 | Reddy | 166/341 |
| 8,057,126 B2 * | 11/2011 | Mogedal et al. | 405/170 |
| 8,087,465 B2 * | 1/2012 | Huang et al. | 166/339 |
| 8,573,305 B2 * | 11/2013 | Reddy | 166/343 |
| 8,627,891 B2 * | 1/2014 | Omvik | 166/366 |
| 8,794,336 B2 * | 8/2014 | Bekkevold | 166/380 |
| 2004/0258482 A1 | 12/2004 | Mackinnon | |
| 2011/0005764 A1 | 1/2011 | Bekkevold | |

FOREIGN PATENT DOCUMENTS

| | | | | |
|---|---|---|---|---|
| GB | 1 595 993 A | 8/1981 | | |
| GB | 2 089 866 A | 6/1982 | | |
| GB | 2 154 295 A | 9/1985 | | |
| GB | 2 192 036 A | 12/1987 | | |
| GB | 2 195 970 A | 4/1988 | | |
| WO | 98/49422 A1 | 11/1998 | | |
| WO | 03/050443 A1 | 6/2003 | | |
| WO | 2004/106696 A1 | 12/2004 | | |
| WO | 2008/012134 A1 | 1/2008 | | |
| WO | WO/2009/082240 | * | 2/2009 | E21B 43/013 |
| WO | 2009/134141 A1 | 11/2009 | | |
| WO | 2010/009510 A1 | 1/2010 | | |

* cited by examiner

CONNECTION APPARATUS AND METHODS

TECHNICAL FIELD

This invention relates to apparatus and methods for positioning and connecting pipelines subsea. In particular, positioning pipelines such as those used in the offshore oil and gas production fields for connection to subsea structures.

BACKGROUND ART

When connecting pipelines such as flowlines, jumpers and risers of either rigid or flexible constructions (herein after all referred to as pipelines) to subsea structures a connection tool can be used, which connects to the end of the pipelines and operates to align the pipelines and subsea structure, and make the connection between the pipeline and subsea structure.

When pipelines are to be connected vertically, the pipeline is stabbed vertically into a receiver of an already installed structure and connected such that pressure is retained inside the pipeline and/or external pressure is prevented from ingress. When connected the resulting connection has to withstand significant operational forces and so must also be mechanically strong. Making such a connection generally requires complex and highly specialised tooling systems.

Typically a vertical installation process involves a deployment phase and a subsequent connection operation. Existing vertical connection tooling systems require deployment of the pipeline and connection of the pipeline to be undertaken in a continuous operation. A typical jumper installation practice comprises attaching an alignment and closing tooling to each end of a jumper to be installed and lowering the jumper towards upward projecting connector halves on an already installed structure. When the ends of the jumper have landed on the installed structures a remotely operated vehicle (ROV) interfaces with the tool operating panel of the connector to operate and power the connector tooling to effect a connection. The ROV then moves to the second end of the jumper and repeats the connection operation. Once the connections are complete the tools are retrieved from both ends of the connected jumper by lift lines deployed from the surface.

The object of the invention is to provide a system which allows for separate deployment and connection operations and simplifies the tooling that is required to be operated by the ROV to complete the connections.

Disclosure of the Invention

A first aspect of the invention provides a vertical connection apparatus for connecting a pipeline to a subsea structure, the apparatus comprising: a guide funnel for controlling the position of the pipeline relative to the subsea structure; a moveable barrier; and an attachment region for a tool operable to move the pipeline relative to the subsea structure; wherein the moveable barrier is operable between an open position in which the pipeline can pass through the guide funnel; and a closed position in which the barrier prevents the end of the pipeline passing through the end of the guide funnel.

The moveable barrier can be a rod which in the closed position can extend across the opening at the lower end of the guide funnel.

The apparatus can be located on the conduit of the subsea structure.

The apparatus can further comprise a connector porch wherein the guide funnel is connected to the connector porch.

The apparatus can further include a clamp for securing the pipeline to the conduit of the subsea structure.

The subsea structure can be a second pipeline.

A second aspect of the invention provides a connection system comprising an apparatus as described above, a subsea structure and a pipeline wherein the pipeline comprises a second attachment region for the tool operable to move the pipeline relative to the subsea structure.

The end of the pipeline can be configured to engage with the interior of the guide funnel of the apparatus.

The system can further comprise the tool connectable to the first and second attachment regions, the tool locates in the attachment regions and is operable to move the pipeline relative to the subsea structure.

The drive mechanism of the tool can be a hydraulic ram.

A third aspect of the invention provides a method for positioning a pipeline subsea for connecting to a conduit of a subsea structure; the method comprising;

providing the subsea structure with an apparatus including a guide funnel, the guide funnel being coaxially aligned above the conduit of the subsea structure;

the guide funnel having a first attachment region for a tool operable to move the pipeline relative to the subsea structure and having a moveable barrier operable between an open position and a closed position; deploying the pipeline into the guide funnel, the pipeline having a second attachment region for the tool;

positioning the moveable barrier in the closed position to prevent the pipeline extending through the guide funnel.

The method can further comprise the steps of:

attaching the tool operable to move the pipeline to the first and second attachment regions;

operating the tool to take the weight of the pipeline;

positioning the moveable barrier to the open position;

operating the tool to bring the pipeline towards a connector porch mounted on the subsea structure;

actuating a clamp to connect the first pipeline to the conduit of the subsea structure.

Attaching the tool to the first and second attachment regions can be carried out using a ROV.

A ROV can be used to operate the moveable barrier.

The method can be carried out using the apparatus as described above and/or the system as described above.

BRIEF DESCRIPTION OF THE DRAWINGS

The invention will now be described by way of example with reference to the accompanying drawings.

MODE(S) FOR CARRYING OUT THE INVENTION

Figure 1:
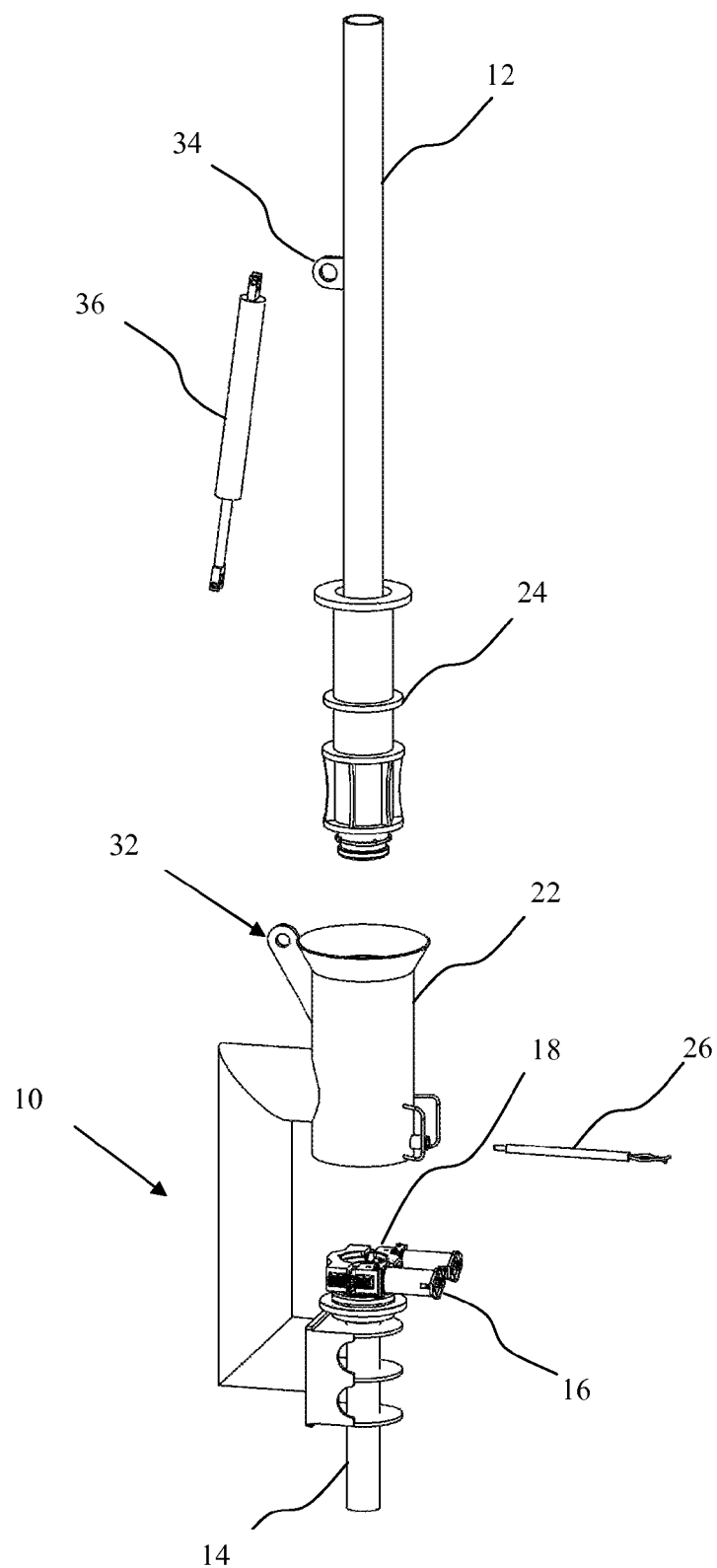
FIG. 1 shows the components of the connection system according to the invention.

FIG. 1 shows the components of the connection system according to the invention for connecting a pipeline 12 to a conduit 14 on a subsea structure.

The connection system may be for joining one length of pipeline to another i.e. a midline connection, or the connection may be at the start or finish point of the pipeline, i.e. a termination connection with another subsea structure, for example a Christmas Tree or subsea manifold.

An apparatus 10 is attached to the conduit 14 of a subsea structure. A connector porch 16 is mounted onto the free end of the conduit 14. The connector porch 16 is associated with a clamp 18 which can secure the connection between the conduit 14 and the pipeline 12. A guide funnel 22 is connected to the connection porch 16. The guide funnel is located such that the central axis of the guide funnel aligns with the central axis of the conduit.

Figure 3:
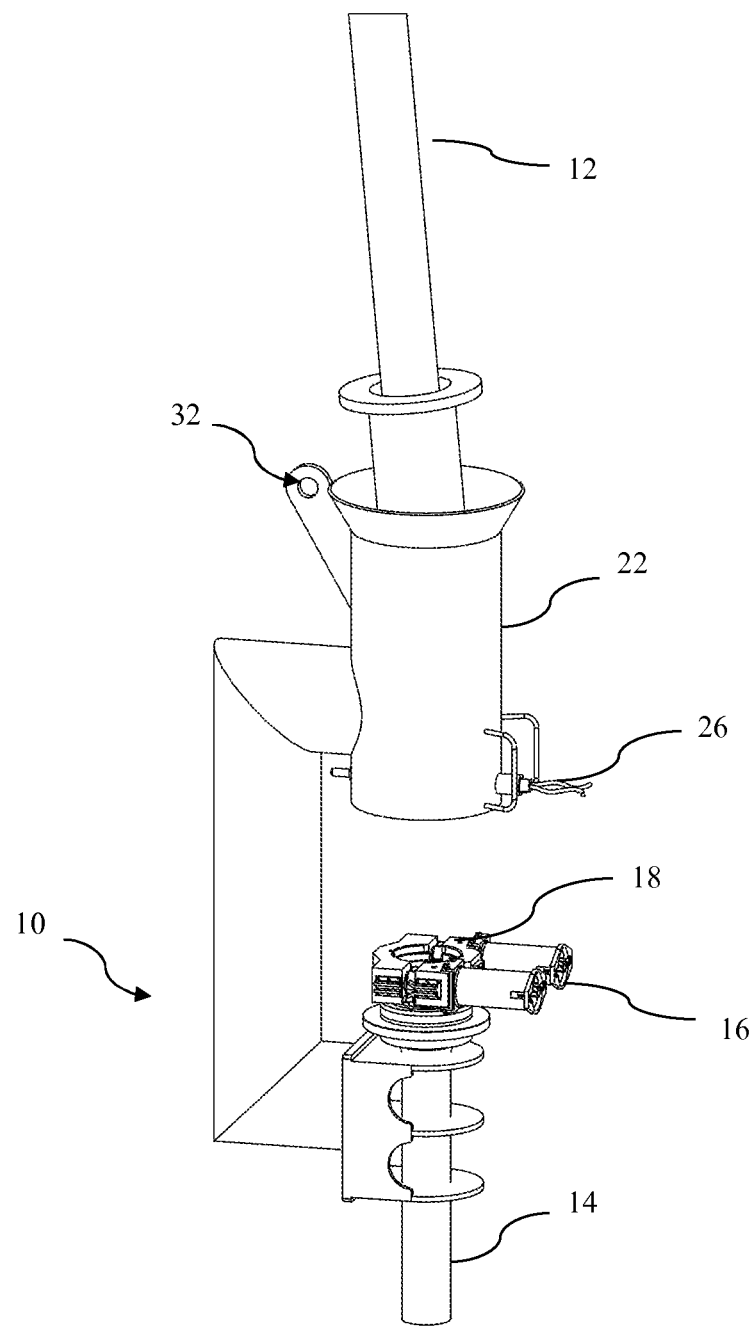
FIGS. 3 and 4 shows the pipeline in a parked position.

The guide funnel 22 is configured to receive the lower end 24 of the pipeline. The guide funnel 22 has two operating positions, an open position and a closed position. In the open position the pipeline 12 can extend through the bottom end of the guide funnel 22. In the closed position, as shown in FIG. 3, the pipeline 12 can enter the funnel 22 but the end 24 of the pipeline 12 is prevented from extending through guide funnel 22 to the connector porch 16 and conduit 14 of the subsea structure.

A moveable barrier 26 is operable to convert the guide funnel 22 between the open position and the closed position. The barrier 26 does not need to totally close off the bottom of the funnel, but should provide a sufficient obstruction in the guide funnel to prevent the pipeline from extending through the guide funnel. The barrier should also have sufficient strength to withstand the forces applied when the pipeline is left parked in the funnel. The length of the guide funnel 22 is sufficiently long to ensure the pipeline is stable when in a parked positioned.

In one embodiment as shown in the figures the moveable barrier 26 is a removable rod. The guide funnel 22 has at least one aperture 28 through which the moveable barrier 26 can extend through. The moveable barrier 26 extends across the opening at the lower end of the guide funnel 22 to create a temporary obstruction in the funnel which prevents the pipeline from extending through the guide funnel. The movable barrier 26 can be removed and replaced by a ROV.

An alternative embodiment provides a moveable barrier that moves between an open position and a closed position which does not require the ROV to remove or replace the movable barrier. The moveable barrier can be integral with the guide funnel and move from an open to closed position and from a closed to open position.

Figure 4:
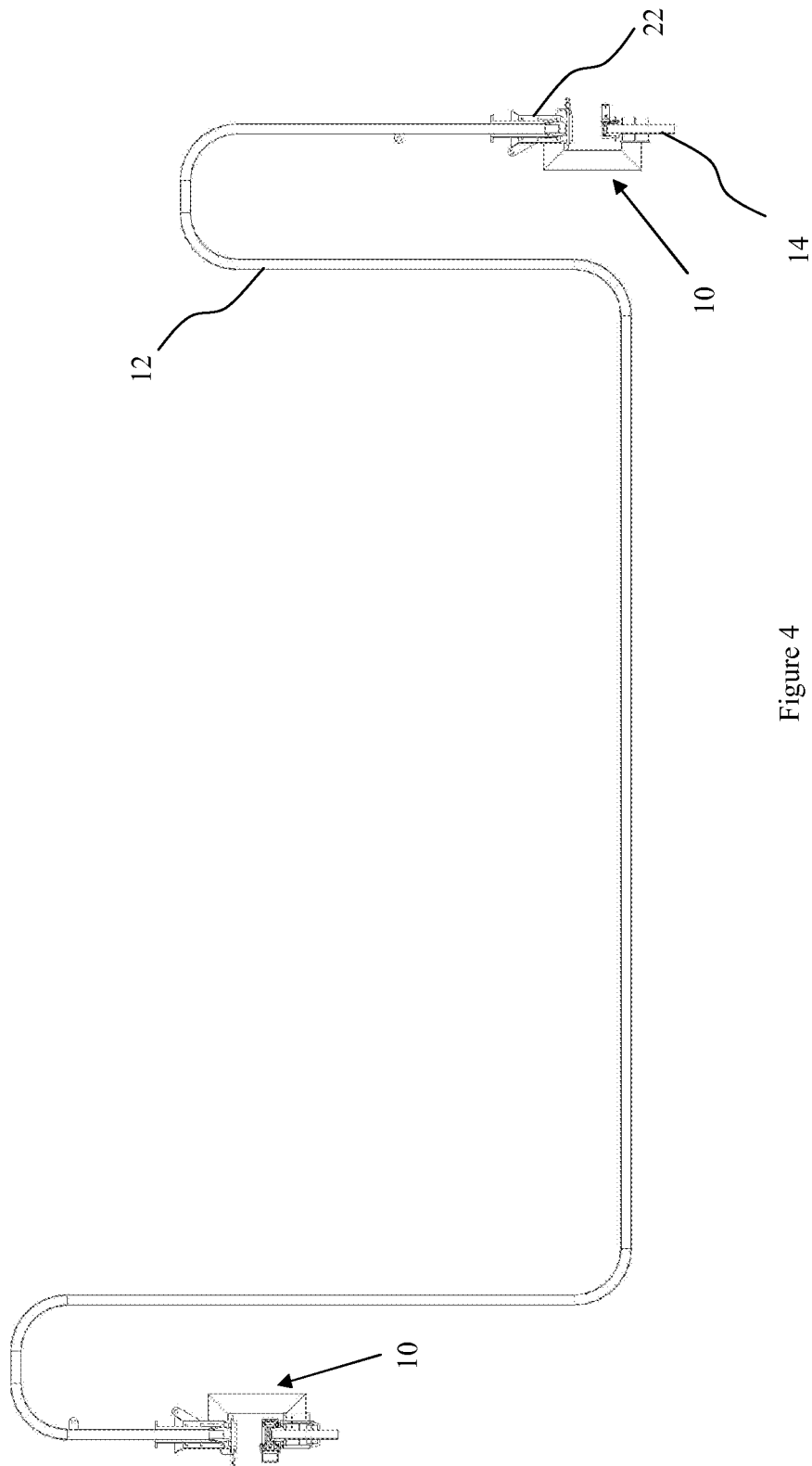

As show in FIGS. 3 and 4 the barrier 26 is inserted across the bottom opening of the guide funnel providing a surface on which the pipeline 12 can rest and be left for a time before attaching to the conduit 14 at a later stage.

An attachment region 32 for a tool 36 is located on the outer surface of the guide funnel 22. The tool is operable to move the pipeline towards and away from the conduit. The tool has a drive mechanism which can move the pipeline into a connectable position with the conduit. The tool can take the weight of the pipeline as it moves the pipeline relative to the conduit. The tool can be a hydraulically operated ram. Although the attachment region 32 is shown located on the guide funnel 26 the attachment region can be located at any suitable position on the apparatus 10 so that a tool 36 can connect to both the attachment region 32 on the conduit 14 and a corresponding attachment region 34 on the pipeline 12

The end 24 of the pipeline 12 is configured to facilitate the alignment of the pipeline 12 with the conduit 14. In one embodiment the end 24 of the first pipeline can be formed from annular discs. The end 24 of the pipeline can also comprise vertical members to assist alignment with the connector porch and conduit.

Figure 5:
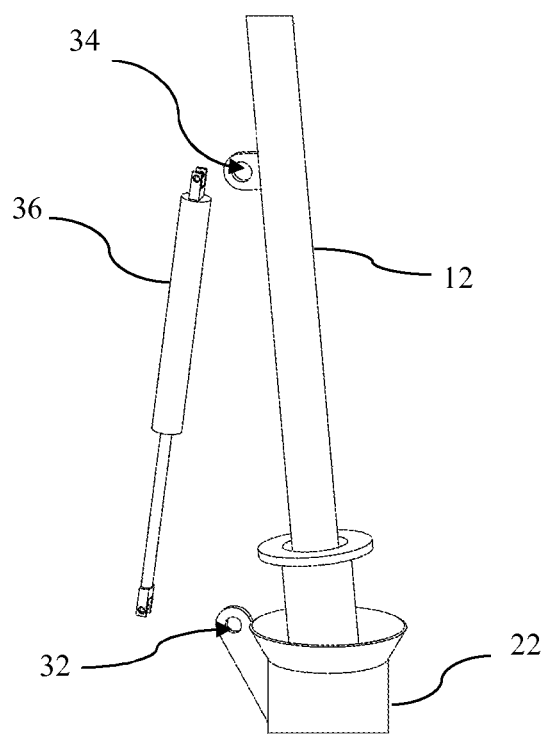
FIG. 5 shows the attachment of the drive mechanism to a parked pipeline.
Figure 6:
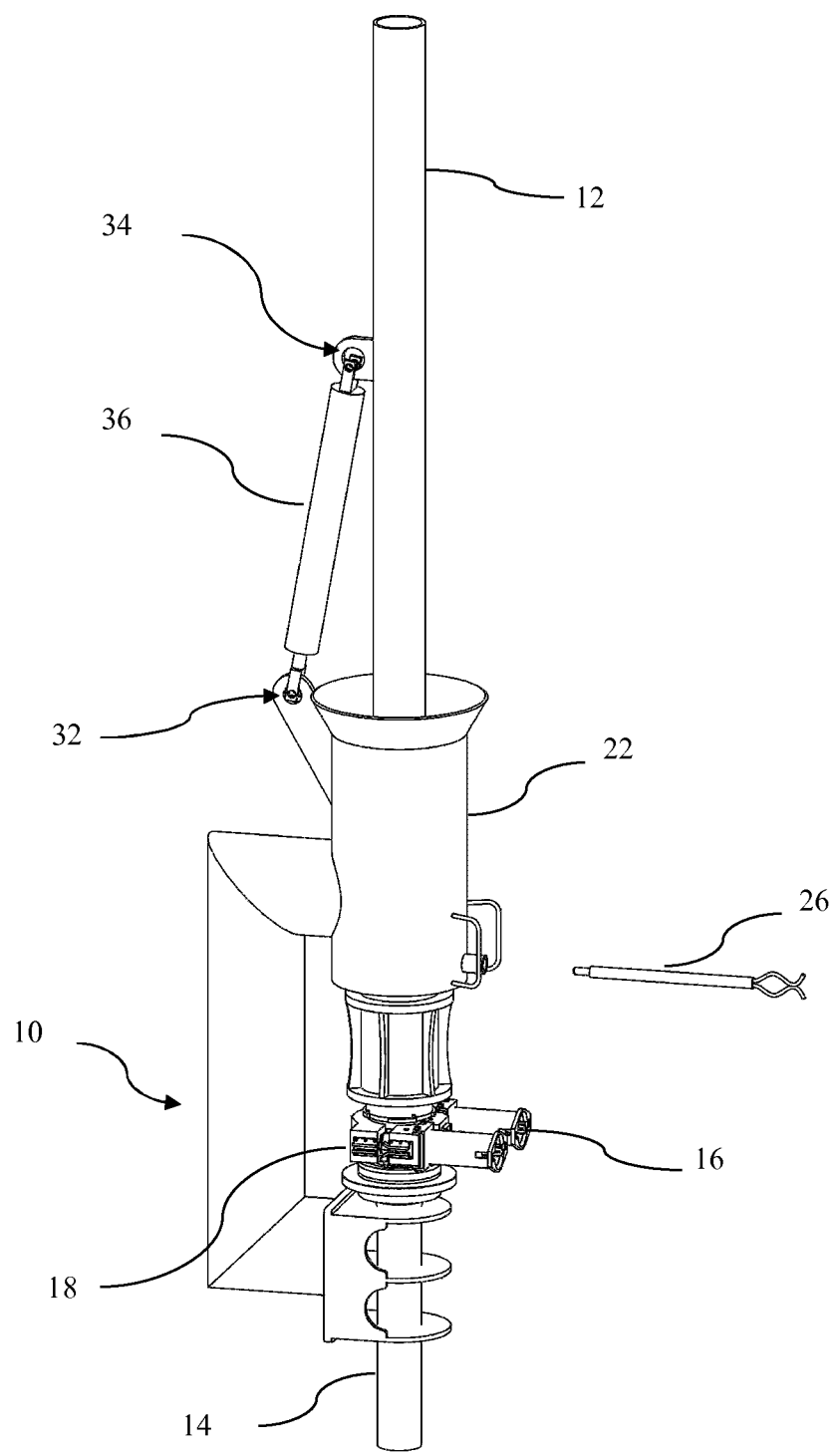
FIG. 6 shows the removal of the moveable barrier and the connecting of the pipeline and subsea structure.
Figure 7:
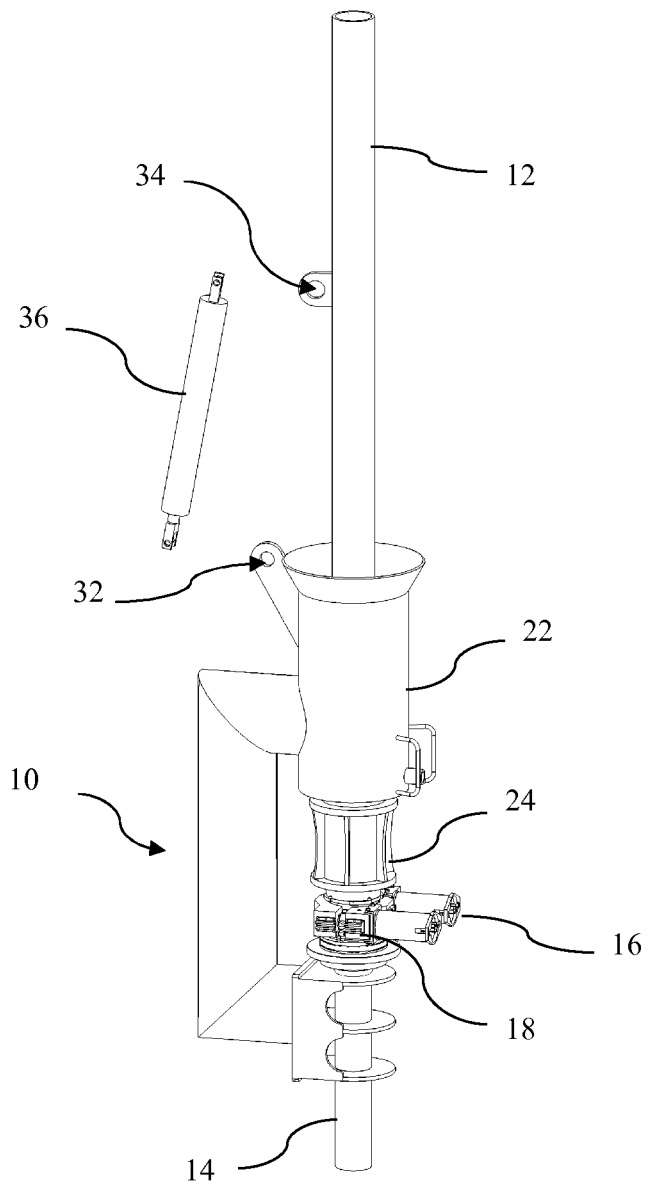
FIG. 7 shows the removal of the drive mechanism after connection of the pipeline and subsea structure

In use, the pipeline line 12 is connected to the conduit 14 in a two stage procedure, comprising an installation stage (FIGS. 2 and 3) and a connection stage (FIGS. 5-7). Depending on the situation the two stages can be run substantially consecutively or alternatively the connection stage can be performed at a later time.

The conduit 14 installed subsea is provided at its end with a apparatus 10 comprising a connector porch 16, a clamp 18 and a guide funnel 22. The guide funnel 22 has a moveable barrier 26 which can create a temporary obstruction in the interior of the funnel 22.

Figure 2:
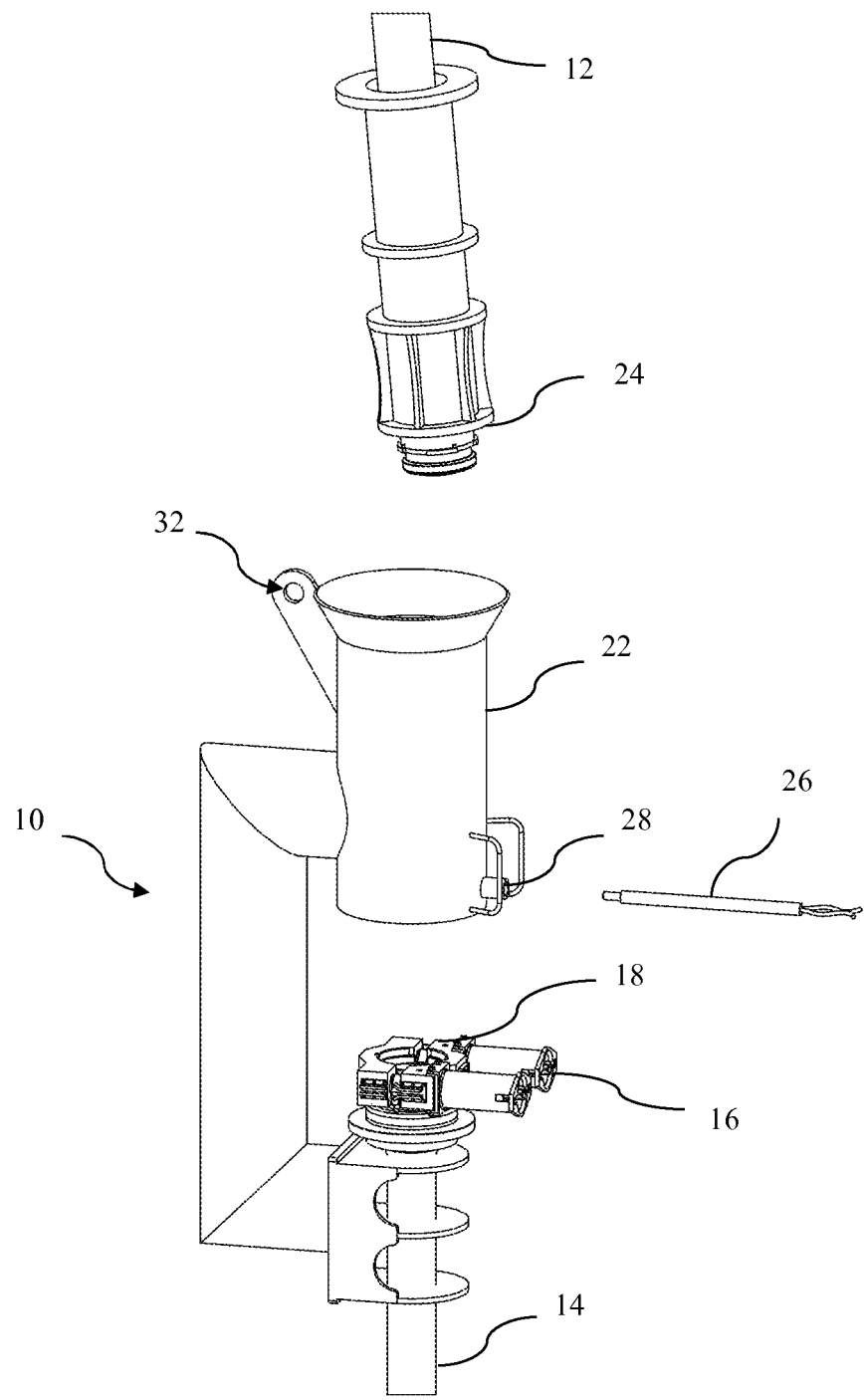
FIG. 2 shows lowering the pipeline to the apparatus connected to a subsea structure.

In the installation phase a vessel (not shown) deploys the pipeline 12 to be connected to the conduit 14. As shown in FIG. 2 the pipeline 12 is brought towards the fixture 10 attached to the conduit 14 and the pipeline 12 is inserted into the guide funnel 22. If the installer does not want to complete the installation and connection of the pipelines in one operation the guide funnel 22 is initially positioned in its closed position. A ROV inserts the moveable barrier 22 into the funnel 22 with the moveable barrier 26 obstructing the exit of the guide funnel to prevent the pipeline 12 from exiting the funnel 22. Alternatively the conduit is initially deployed with the apparatus attached and having the moveable barrier already inserted in the guide funnel such that the guide funnel 22 is in the closed position. The profiled end 24 of the first pipeline 12 is inserted into the guide funnel 26 and rests on the moveable barrier 26 and is left in a parked position, as shown in FIGS. 3 and 4.

When at a later stage the connection between the pipeline 12 and conduit 14 is required to be completed the connection phase can be initiated.

In the connection phase a ROV can be deployed carrying the tooling required to complete the connection between the pipeline 12, and the conduit 14. The ROV deploys a tool 36 which is connected to the attachment points 32, 34 on the pipeline 12 and on the apparatus 10. The tool 36 is actuated to support the weight of the pipeline 12. The moveable barrier 26 is moved to the open position in the guide funnel 22. The tool 36 is operated to move the pipeline 12 through the guide funnel 22 towards the conduit 14. In the embodiment shown in FIG. 6 the rod is removed from the guide funnel by the ROV (not shown). The hydraulic ram is retracted to move the pipeline through the guide funnel. The removal of the barrier allows the pipeline to interact with the guide funnel 22 to achieve the positional and angular alignment required to ensure the end face of the pipeline 12 comes into contact with the end face of the conduit 14 and allows the end 24 of the pipeline 12 to be deployed out through the guide funnel 22 towards the conduit 14.

Figure 8:
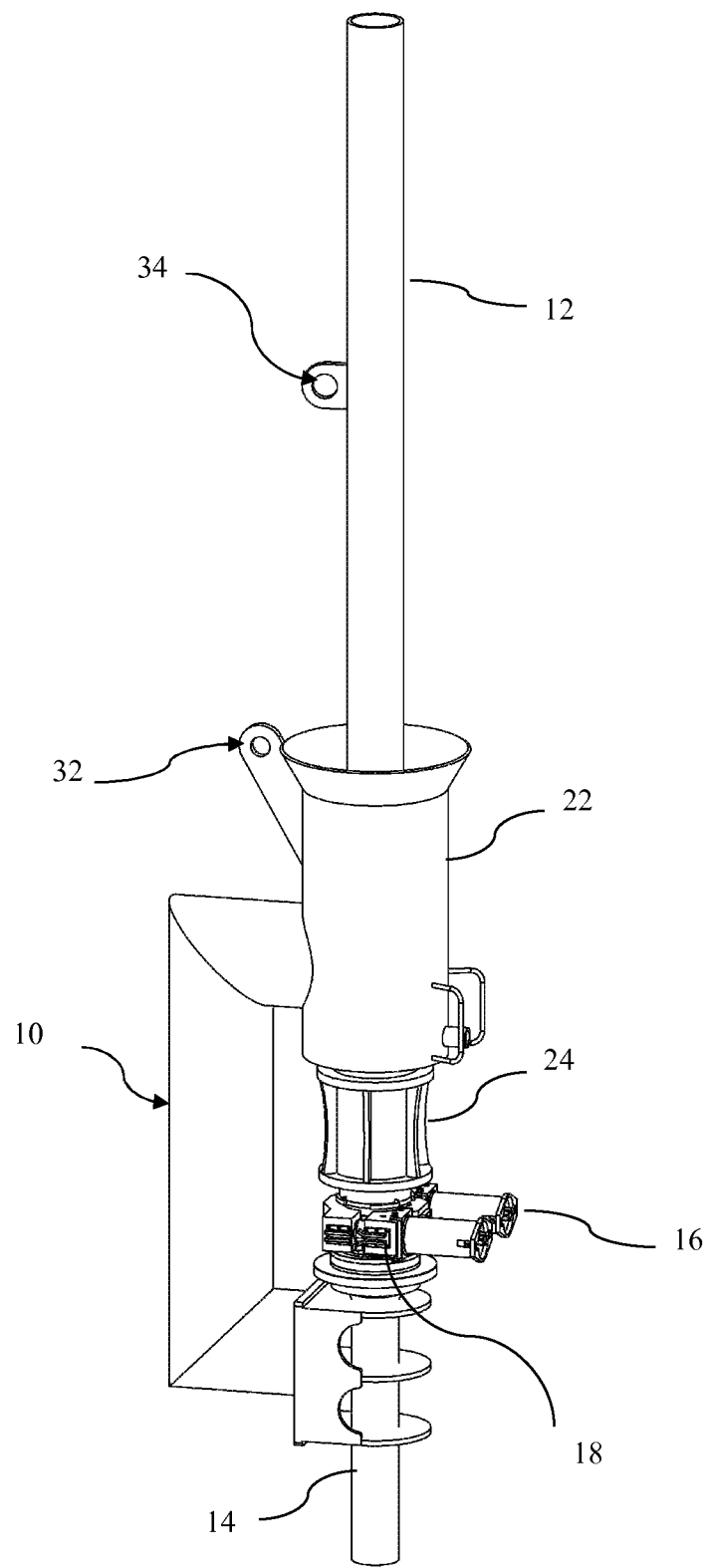
FIG. 8 shows the connected pipeline and subsea structure.

Once the end face of the conduit is in contact with the end face of the pipeline, the clamp 18 can be closed to lock the pipeline 12 to the conduit 14, as shown in FIG. 6. A pressure tight connection can be secured between the pipeline and the conduit. The closing of the clamp 18 can be operated by a ROV. The tool 36 can then be removed by the ROV, leaving no hydraulic equipment attached to the connection apparatus 10, as shown in FIG. 7 and FIG. 8.

This two stage procedure allows the pipeline 12 to be aligned and connected to the conduit 14 with a single ROV deployed tool 36. This is a benefit over the prior art as the tooling can be taken subsea on the ROV or in a deployment basket allowing multiple connections to completed without the need to return the tools to the surface or to use multiple sets of tooling.

The connection system and the working parts of the connection system such as the moveable barrier and drive mechanism, are retrievable and replaceable by ROV without the need for supporting surface lift line.

Using multiple sets of tooling is costly whilst in deep water, re-use of a single set of tooling that has to be retrieved to surface as each connecting pipe is run subsea is also costly as the time to take a piece of equipment to the surface and subsequently return it subsea is extended and therefore costly in vessel time.

The two stage deployment and connection procedure allows the pipeline to be landed and parked by a deployment vessel. At a later time another vessel can deploy the ROV with tooling to connect the pipeline. This later connection operation does not require the presence of a lifting line to take the weight of the pipeline during the connection operation. This allows a connection operation to be completed with a smaller vessel without the crane capability of the original installation vessel.

If it is required to later separate the pipes for example to change a gasket, the disconnection process is the reverse of the connection process. Disconnection and movement of the pipeline 12 to its parked position is achieved by ROV with no requirement for a surface lift line or crane to support the weight of the pipeline or connector.

When the connection requires releasing a ROV tool deploys a tool 36. The tool 36 is connected to the tool attachment points 34 on the pipeline 12 and 32 on the guide funnel 22. The clamp 18 securing the pipeline 12 and the conduit 14 together is released. The tool is extended to lift the pipeline 12 away from the conduit 14 to provide a sufficient gap to enable the moveable barrier 26 to be reinserted by a ROV into the lower end of the guide funnel 22. Inserting the moveable barrier 26 provides a secure platform for the pipeline to rest in the guide funnel above the conduit.

Gasket exchange or other activity can then be carried out, and the connection re-established or the pipeline 12 may be removed completely.

Other changes can be made within the scope of the invention. For example while the invention is described with respect to the connection of two pipelines together. The connection system can also be used to connect a first pipeline to a subsea structure having a pipeline connection terminus, for example a Christmas tree, subsea manifold. While the moveable barrier is exemplified as a removable rod other mechanisms for maintaining the end of the first pipeline within the guide funnel can also be used. While a clamp is exemplified as a device for secure the pipeline to the conduit other connectors can be used to secure the pipeline to the conduit.

The invention claimed is:

1. A vertical connection apparatus for connecting a pipeline to a subsea structure the apparatus comprising:
a guide funnel for controlling the position of the pipeline relative to the subsea structure;
a moveable barrier; and
an attachment region for a tool operable to move the pipeline relative to the subsea structure;
wherein the moveable barrier is operable to convert the guide funnel between an open position in which the pipeline can pass through the guide funnel; and a closed position in which the barrier prevents the lower end of the pipeline passing through the end of the guide funnel.

2. An apparatus according to claim 1 wherein the moveable barrier is a rod which in the closed position can extend across the lower end of the guide funnel.

3. An apparatus according to claim 1 wherein the apparatus is located on a conduit of the subsea structure.

4. An apparatus according to claim 1 further comprising a connector porch wherein the guide funnel is aligned with the connector porch.

5. An apparatus according to claim 1 further comprising a clamp for securing the pipeline to the conduit of the subsea structure.

6. An apparatus according to claim 1 wherein the subsea structure is a second pipeline.

7. A pipeline connection system comprising an apparatus according to claim 1, the subsea structure, and the pipeline, wherein the pipeline includes an attachment region for a tool operable to move the pipeline relative to the subsea structure.

8. A system according to claim 7 wherein the end of the pipeline is configured to engage with the interior of the guide funnel.

9. A system according to claim 7 further comprising the tool connectable to the first and second attachment regions.

10. A system according to claim 9 wherein the tool has a drive mechanism which is a hydraulic ram.

11. A method for positioning a pipeline for connecting to a conduit of a subsea structure; the method comprising;
providing the subsea structure with a guide funnel, the guide funnel being coaxially aligned above the end of the conduit of the subsea structure; the guide funnel having first attachment region for a tool operable to move the pipeline relative to the subsea structure and having a moveable barrier operable between an open position and a closed position;
deploying the pipeline into the guide funnel, the pipeline having a second attachment region;
positioning the moveable barrier to the closed position to prevent the pipeline extending through the guide funnel.

12. A method according to claim 11 further comprising the steps of:
attaching a tool operable to move the pipeline to the first and second attachment regions;
operating the tool to take the weight of the pipeline;
positioning the moveable barrier to the open position;
operating the tool to bring the pipeline towards a connector porch mounted on the subsea structure;
actuating a clamp to connect the pipeline to the conduit.

13. A method according to claim 12 comprising attaching the tool to the first and second attachment regions using a ROV.

14. A method according to claim 11 comprising using a ROV to operate the moveable barrier.

15. A method according to claim 11 comprising using an apparatus comprising
the guide funnel for controlling the position of the pipeline relative to the subsea structure;
the moveable barrier; and
the attachment region for a tool operable to move the pipeline relative to the subsea structure;
wherein the moveable barrier is operable to convert the guide funnel between the open position in which the pipeline can pass through the guide funnel; and the closed position in which the barrier prevents the lower end of the pipeline passing through the end of the guide funnel.

16. A method according to claim 11 comprising using a system comprising, the subsea structure, the pipeline, and an apparatus,
wherein the apparatus comprises:
the guide funnel for controlling the position of the pipeline relative to the subsea structure;
the moveable barrier; and the attachment region for a tool operable to move the pipeline relative to the subsea structure;

wherein the moveable barrier is operable to convert the guide funnel between the open position in which the pipeline can pass through the guide funnel; and the closed position in which the barrier prevents the lower end of the pipeline passing through the end of the guide funnel; and wherein the pipeline includes the second attachment region for a tool operable to move the pipeline relative to the subsea structure.

* * * * *